(12) United States Patent
Halstead (10) Patent No.: US 6,347,907 B1
(45) Date of Patent: Feb. 19, 2002

(54) DOLLY AND METHOD OF USE

(76) Inventor: David Halstead, 5273 Alpine Meadows St., Alta Loma, CA (US) 91737

( * ) Notice: Subject to any disclaimer, the term of this patent is extended or adjusted under 35 U.S.C. 154(b) by 0 days.

(21) Appl. No.: 09/584,841

(22) Filed: May 31, 2000

Related U.S. Application Data (63) Continuation-in-part of application No. 09/478,965, filed on Jan. 6, 2000, now abandoned.

(51) Int. Cl.$^7$ .......................... E01C 19/24; B62D 21/02; B62D 21/09
(52) U.S. Cl. .......................... 404/85; 404/112; 280/43.1; 280/47.131; 280/47.17; 280/47.24; 301/111
(58) Field of Search .......................... 404/25, 85, 112; 301/111, 121; 451/353; 280/43.1, 43.21, 47.17, 47.15, 47.24, 47.28, 47.27, 47.131

(56) References Cited

U.S. PATENT DOCUMENTS

| | | | |
|---|---|---|---|
| 299,494 A | | 5/1884 | Price |
| 1,017,799 A | | 2/1912 | Read |
| 1,299,990 A | | 4/1919 | Miller |
| 1,530,116 A | | 3/1925 | Hawkins |
| 1,591,997 A | | 7/1926 | Pond |
| 2,134,884 A | | 11/1938 | Moore, Jr. |
| 2,137,560 A | | 11/1938 | Anderson |
| 2,200,921 A | | 5/1940 | Granell |
| 2,201,420 A | | 5/1940 | Zschau |
| 2,567,185 A | | 9/1951 | Coviello |
| 2,722,889 A | | 11/1955 | Reynolds |
| 2,880,431 A | * | 4/1959 | Noland ........................ 280/43.1 |
| 3,091,158 A | | 5/1963 | Bunger et al. |
| 3,260,533 A | * | 7/1966 | Ryder ........................ 280/43.1 |
| 3,262,377 A | | 7/1966 | Lursen |
| 3,452,380 A | | 7/1969 | Walther |
| 3,463,505 A | | 8/1969 | German et al. |
| 3,732,590 A | | 5/1973 | Horst |
| 4,762,303 A | | 8/1988 | Thomas |
| 4,762,333 A | * | 8/1988 | Mortenson ................. 280/43.1 |
| 5,042,827 A | * | 8/1991 | Mortenson ................. 280/43.1 |
| 5,088,799 A | | 2/1992 | Redmon et al. |
| 5,096,265 A | | 3/1992 | Chang |
| 5,238,323 A | | 8/1993 | Allen et al. |
| D342,888 S | | 1/1994 | Rutter et al. |
| 5,288,166 A | | 2/1994 | Allen et al. |
| 5,328,295 A | | 7/1994 | Allen |
| 5,484,154 A | * | 1/1996 | Ward ........................ 280/43.1 |
| 5,903,956 A | | 5/1999 | Theising |
| 6,059,299 A | * | 5/2000 | Rust ...................... 280/47.131 |
| 6,135,466 A | * | 10/2000 | Irwin ...................... 280/47.28 |

* cited by examiner

*Primary Examiner*—Thomas B. Will
*Assistant Examiner*—Alexandra K Pechhold
(74) *Attorney, Agent, or Firm*—Eric Karich (57) ABSTRACT

A dolly for transporting a heavy object has a frame, a lifting element, and a pair of wheels. The lifting element engages a lifting point of the heavy object to enable the dolly to support the heavy object for wheeled movement. The frame is shaped to fit around the heavy object when the lifting element is removably attached to the lifting point of the heavy object. The lifting element is preferably rotatably connected to the frame to facilitate lifting the heavy object onto the dolly. Each of the pair of wheels is operably attached to the frame and aligned along an axis to support the heavy object between the pair of wheels such that the center of gravity of the heavy object is located approximately on the axis when the lifting element is attached to the lifting point of the heavy object.

13 Claims, 6 Drawing Sheets

DOLLY AND METHOD OF USE

This application is a Continuation-in-part of patent application Ser. No. 09/478,965 filed Jan. 6, 2000, now abandoned.

BACKGROUND OF THE INVENTION

1. Field of the Invention

This invention relates generally to dollies, and more particularly to a dolly useful for quickly and easily transporting a heavy object.

2. Description of Related Art

Since its invention in 1939 by Marvin Whiteman, Sr., the power trowel has become an indispensable tool in the construction industry. One of its great drawbacks, however, is that the standard power trowel is extremely heavy, requiring 2–3 strong workers to lift and move. Not only is moving such a heavy machine physically exhausting to the workers, it is also a potential source of injuries to workers who attempt to lift too heavy of a load at the end of a long work day.

Various devices have been contrived to attempt to make the power trowel easier to manage. Redmon et al., U.S. Pat. No. 5,008,799, the state of the art in this field, teaches the attachment of three specially designed wheels to the blade guard of the power trowel. While the wheels make transport of the power trowel easier, there are serious disadvantages to the Redmon approach. First, it is cumbersome to attach the wheels to the power trowel because the power trowel be lifted as each of three different wheels is attached to the blade guard. This is both physically cumbersome and time consuming. Second, the manufacturer specifically warns against lifting the power trowel by the blade guard. The blade guard is not designed to support the full weight of the power trowel and the blade guard could be damaged while the power trowel is being moved.

Power trowels are only one example of a heavy object that does not have wheels and yet must be moved, at least upon occasion. The dolly described in the present invention can be easily adapted for use with many heavy pieces of equipment, such as earth compactors and other heavy machines lacking wheels. The dolly can also be adapted for use with a pallet, and the pallet can be filled with almost any heavy object, such as a generator.

Examples of prior art dollies include Granell, U.S. Pat. No. 2,200,921, and Chang, U.S. Pat. No. 5,096,265. Examples of wheeled machinery such as power trowels include Horst, U.S. Pat. No. 3,732,590, Bunger et al., U.S. Pat. No. 3,091,158, Moore, Jr., U.S. Pat. No. 2,134,884, Lursen, U.S. Pat. No. 3,262,377, and Pond, U.S. Pat. No. 1,591,997.

The prior art teaches various dollies for use with a heavy object such as a power trowel. However, the prior art does not teach a dolly that a single person can removably attach to a heavy object and lever the heavy object onto a pair of wheels for easy movement. The present invention fulfills these needs and provides further related advantages as described in the following summary.

SUMMARY OF THE INVENTION

The present invention teaches certain benefits in construction and use which give rise to the objectives described below.

The present invention provides a dolly for transporting a heavy object. The dolly has a frame, a lifting element, and a pair of wheels. The lifting element engages a lifting point of the heavy object to enable the dolly to support the heavy object for wheeled movement. The frame is shaped to fit around the heavy object when the lifting element is removably attached to the lifting point of the heavy object. The lifting element is preferably rotatably connected to the frame to facilitate lifting the heavy object onto the dolly. Each of the pair of wheels is operably attached to the frame and aligned along an axis to support the heavy object between the pair of wheels such that the center of gravity of the heavy object is located approximately on the axis when the lifting element is attached to the lifting point of the heavy object.

A primary objective of the present invention is to provide a dolly for transporting a heavy object, the dolly having advantages not taught by the prior art.

Another objective is to provide a dolly that can be easily attached to the heavy object without requiring the user to lift the heavy object, and then allowing the user to lift the heavy object onto a pair of wheels using the dolly as a lever.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

The above described drawing figures illustrate the invention, a dolly 30 for transporting a heavy object 10 having a lifting point 20. The dolly 30 has a frame 32, a lifting element 34, and a pair of wheels 38. As shown in FIGS. 1, 6, 7, and 8, the frame 32 is shaped to fit around the heavy object 10 when the lifting element 34 is removably attached to the lifting point 20 of the heavy object 10. Each of the pair of wheels 38 is operably attached to the frame 32 and aligned along an axis to support the heavy object 10 between the pair of wheels 38 such that the center of gravity of the heavy object 10 is located approximately on the axis when the lifting element 34 is attached to the lifting point 20 of the heavy object 10. Although it is preferred that the center of gravity of the heavy object 10 is exactly on the axis, it is only necessary that the center of gravity be close enough to the axis so that the heavy object 10 can be easily manipulated onto and around on the dolly 10, so a fair amount of variance is acceptable.

Frame

In the preferred embodiment, as shown in FIGS. 1, 2, 6, and 9, the frame 32 is generally U-shaped and has two ends 32A and 32B, and each of the pair of wheels 38 is attached adjacent to one of the two ends 32A and 32B. In its most preferred embodiment, the frame 32 is constructed of a single piece of strong, rigid, and durable material such as tubular steel which has been bent onto the required U-shape. In an alternative embodiment, described below, the frame 32 is constructed of multiple pieces to allow the size of the frame 32 to be customized.

Lifting Element

Figure 1:
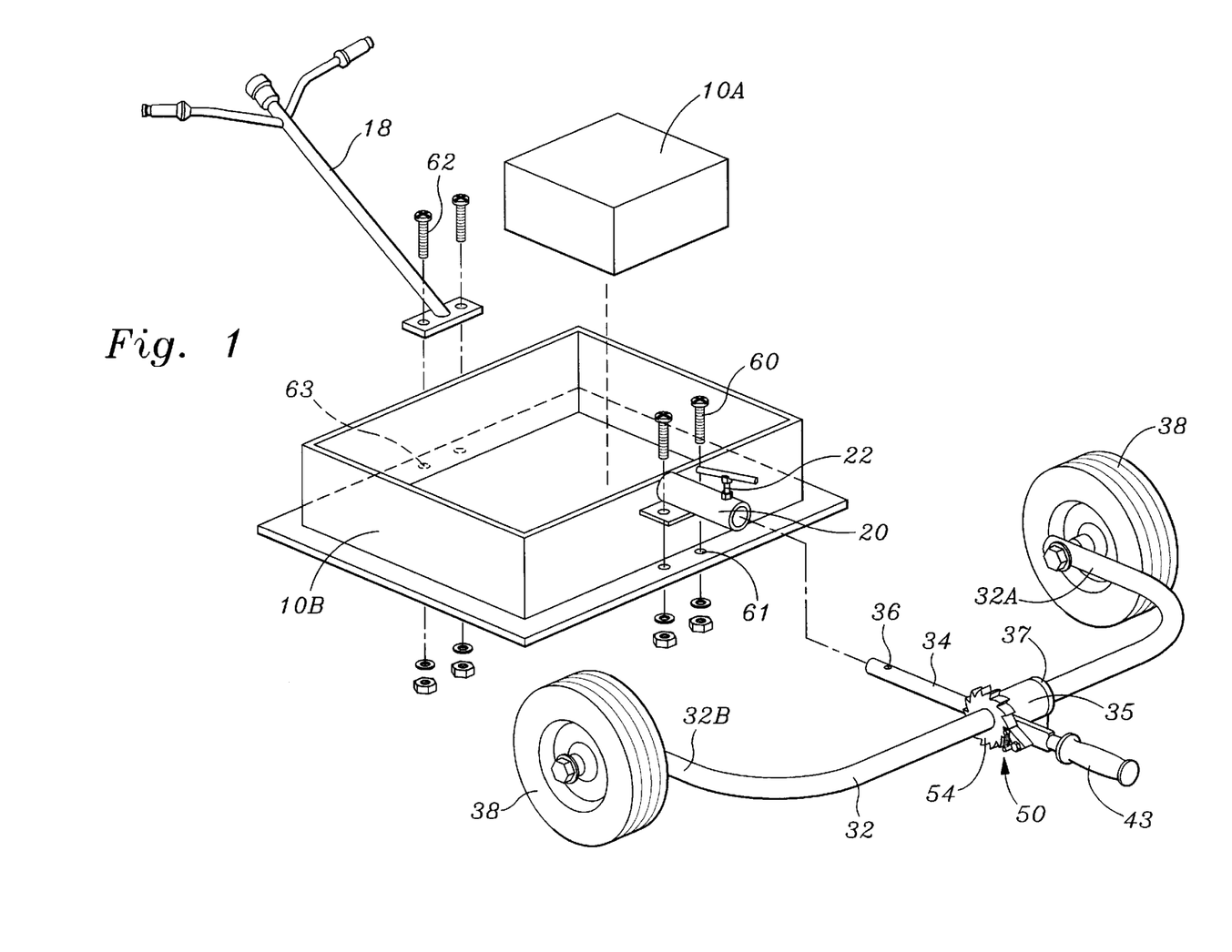
FIG. 1 is an exploded perspective view of an embodiment of the present invention.
Figure 2:
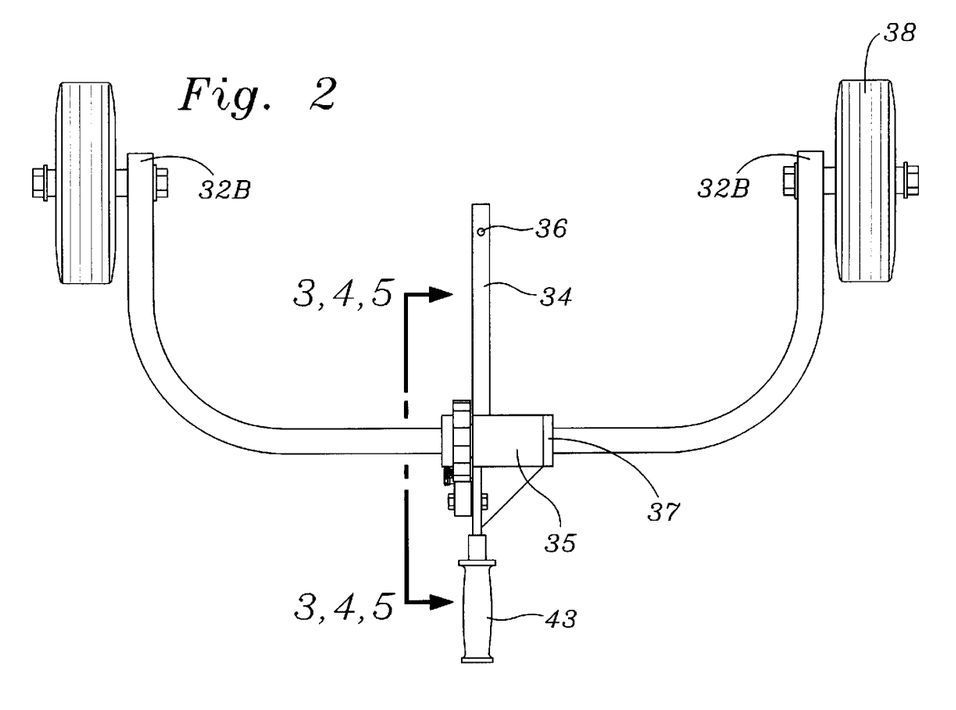
FIG. 2 is a top plan view of a preferred embodiment of a dolly used in the present invention.

As shown in FIGS. 1 and 2, the lifting element 34 is preferably a lifting bar constructed of a strong, rigid, and durable material such as steel. As shown in FIGS. 1–5, the lifting bar 34 is preferably pivotally attached to the frame 32, as described below. The dolly 30 preferably further includes a hand grip 43 extending outwardly from the frame 32 opposite the lifting bar 34. In the preferred embodiment, as shown in FIGS. 1 and 2, the hand grip 43 is a rigid, strong and durable steel bar welded onto the sleeve 35. Proper use of the hand grip 43 is described in more detail below. In an alternative embodiment, as shown in FIGS. 6–9, the hand grip 43 is welded directly to the frame 32. The hand grip 43 allows the user to manipulate the dolly 30 to insert the lifting bar 34 into the lifting bore 20.

Pivotal Connection

In the preferred embodiment, as shown in FIGS. 1–5, the lifting bar 34 is pivotally connected to the frame 32 of the dolly 30. In the most preferred embodiment, the lifting bar 34 is welded to a sleeve 35 shaped to slide around the frame 32 before the frame 32 is bent into the U-shape. During manufacture of the frame 32, the sleeve 35 is positioned on the frame 32 and a positioning element 37 is welded on one side of the sleeve 35 and a ratchet mechanism 50, described below, is welded to the other side, the positioning element 37 and the ratchet mechanism 50 cooperating to hold the sleeve 35 in position. After the sleeve has been correctly positioned, then the frame 32 is bent into its preferred shape. The sleeve 35 allows the lifting bar 34 to pivot between a lowered position to a raised position.

Ratchet Mechanism

The sleeve 35 further includes a means for restricting 50 the lifting bar 34 from returning to the lowered position once the lifting bar 34 has been raised to the raised position. In the preferred embodiment, the means for restricting 50 is a ratchet mechanism that functions to restrict the lifting bar 34 from returning to the lowered position once the lifting bar 34 has been raised to the raised position. In this embodiment, the hand grip 43 has a pawl 52 that cooperates with a ratchet 54 on the frame 32 to restrict the lifting bar 34 from returning to the lowered position. A spring 56 biases the pawl 52 towards a locked position. Raising the frame 32 causes the ratchet 54 to advance, the ratchet 54 forcing the pawl 52 to an unlocked position against the bias of the spring 56 until the pawl 52 advances to the raised position and the pawl 52 returns to the locked position. The pawl 52 can be manually turned to the unlocked position by the user for returning the ratchet 54 and frame 32 to the lowered position against the inclination of the ratchet 54.

In alternative embodiments, mechanisms other than the ratchet mechanism 50 can be used. An alternative mechanism is a bolt (not shown) similar to the locking pin 22 described above, the bolt being used to lock the sleeve 35 to an aperture (not shown) in the frame 32. An aperture (not shown) in the sleeve 35 aligns with the frame aperture when the dolly 30 is in the raised position, and the user simply inserts the bolt through the two apertures to lock the frame 32 in the raised position. Those skilled in the art can devise countless alternative embodiments of this structure, and obvious alternative embodiments should be considered within the scope of this invention.

Lifting Point

The lifting point 20 is the point of the heavy object 10 to which the lifting bar 34 can be attached. The lifting point 20 is preferably a lifting bore shaped to removably engage the lifting bar 34 of the dolly 30. When the lifting bar 34 is positioned within the lifting bore 20, the wheels 38 are positioned to support the power trowel 10 for wheeled motion. The lifting bore 20 preferably has a bore aperture 21 and the lifting bar 34 preferably has a bar aperture 36. A locking pin 22 is shaped to removably engage both the bar aperture 36 and the bore aperture 21 to lock the lifting bar 34 within the lifting bore 20.

A bore meeting the requirements of the lifting bore 20 is already provided on the power trowels shown in the prior art. The lifting bore 20 provides a "hard point" for lifting the power trowel 10 safely and without damage. The standard use of the lifting bore 20, however, is simply to accept a rigid bar (not shown) so that a user can lift the power trowel 10 by grasping and lifting the rigid bar. If the lifting bore 20 is not already present on the heavy object 10, a lifting bore 20 should be bolted onto the heavy object 10 with a plurality of bore bolts 60, as shown in FIG. 1.

In a similar fashion, the upwardly extending handle 18 should be bolted onto the heavy object 10 with a plurality of handle bolts 62, as shown in FIG. 1. Including the upwardly extending handle 18 is desirable because the upwardly extending handle 18 facilitates the manipulation of the heavy object 10. In an alternative embodiment (not shown), the upwardly extending handle 18 is attached to the dolly 30, although it is preferred that the handle be attached to the heavy object 10.

Heavy Object

Figure 6:
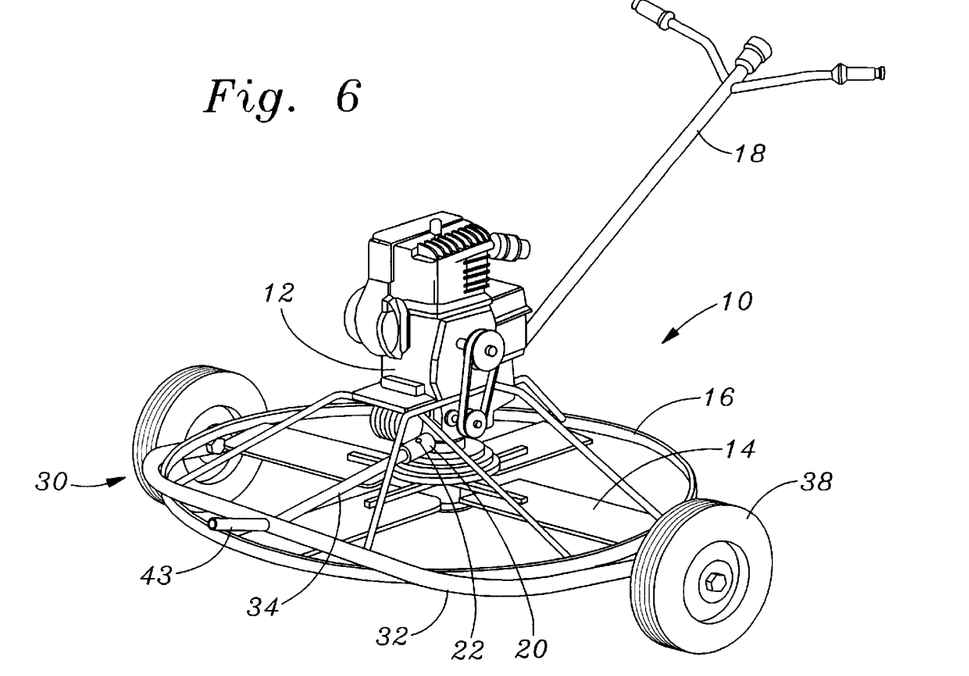
FIG. 6 is an alternative embodiment of the dolly being used to support a power trowel.
Figures 7, 8:
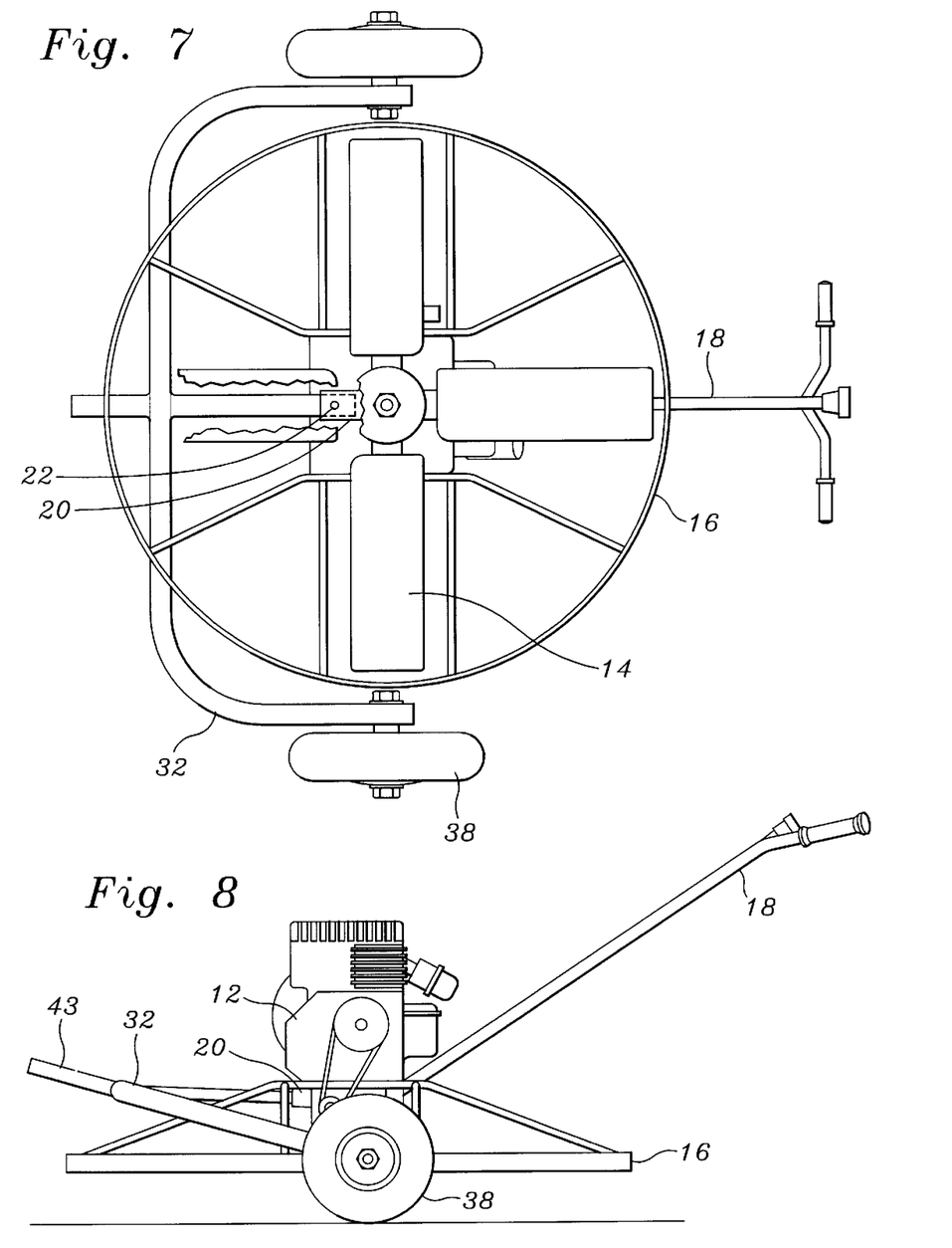
FIG. 7 is a bottom plan view thereof showing one of the blades of the power trowel cut away to better illustrate the connection of the dolly to the power trowel.
FIG. 8 is a side elevational view thereof.

In the preferred embodiment, the heavy object 10 is a power trowel having an engine 12 operably engaged to a plurality of trowel blades 14. As shown in FIGS. 6–8, the engine 12 supports a blade guard 16 that surrounds the plurality of trowel blades 14 to prevent the user from being injured by the rotating plurality of trowel blades 14. The engine 12 provides an upwardly extending handle 18 for controlling and directing the power trowel 10. The power trowel 10 is preferably constructed of a rigid and durable material such as steel. The power trowel 10 is well known in the art and is therefore not described in further detail. Examples of power trowels are described in Redmon et al., U.S. Pat. No. 5,008,799, and Allen et al., U.S. Pat. No. 5,238,323, hereby incorporated by reference.

In the preferred embodiment, the engine 12 of the power trowel 10 provides the lifting point 20 for lifting the power trowel 10. In this preferred embodiment, the lifting point 20 is the lifting bore, described above, shaped to receive a lifting bar 34 of the dolly 30. While the lifting point 20 is described as part of the engine 12, those skilled in the art will recognize that this only means that the lifting point 20 is closely associated with the engine 12 so that the weight of the engine 12 can be properly supported. While alternative positions for the lifting point 20 may be devised by those skilled in the art, they are within the scope of this invention if they provide the requisite support to the engine 12.

Although the dolly 30 is preferably used with a power trowel 10, the dolly 30 can also be used with almost any heavy object 10. In one alternative embodiment, as shown in FIG. 1, the heavy object 10 is a power generator 10A carried in a pallet 10B. The heavy object 10 can also be an earth compactor (not shown), or other items that are heavy and yet do not have wheels for transport. As shown in FIGS. 1 and 2, it is critical that the heavy object 10 include a lifting point 20 that is suitable.

Telescoping Frame

Figures 9, 10:
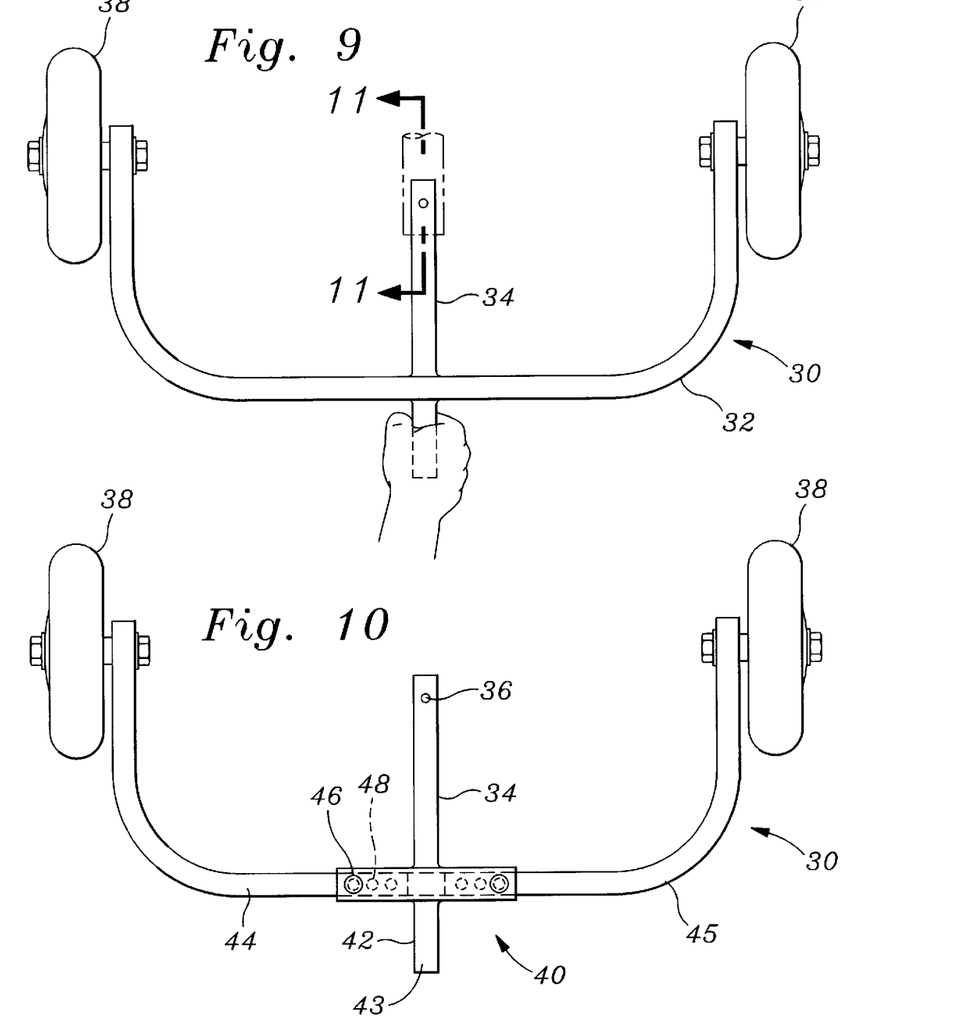
FIG. 9 is a top plan view of the dolly.
FIG. 10 is a top plan view of another embodiment of the dolly, the frame of the preferred embodiment being telescopically adjustable in size.
Figure 11:
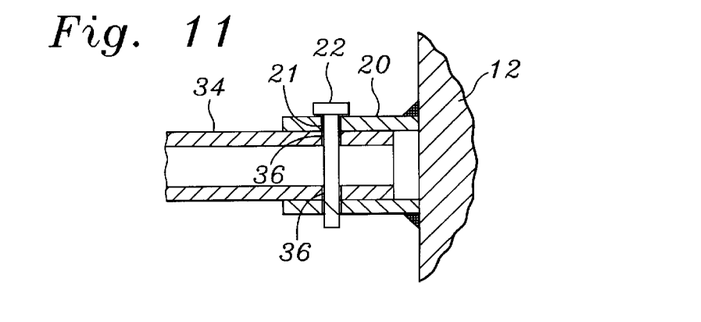
FIG. 11 is a sectional view thereof taken along line 11—11 in FIG. 9.

To facilitate use of the dolly 30 with power trowels of various sizes, the frame 32 of the dolly 30 can further include a means for adjusting the size of the frame 40. Those skilled in the art can devise many telescoping mechanisms to fulfill this requirement. In the preferred embodiment of the size adjusting means 40, as shown in FIG. 10, the frame 32 includes a center portion 42 that telescopingly engages a left frame arm 44 and a right frame arm 45. The center portion 42 provides the lifting bar 34. Each of the left frame arm 44 and the right frame arm 45 is supported by one of the pair of wheels 38. A frame locking pin 46 locks each of the left and right frame arms 44 and 45 to the center portion 42 by selectively engaging one of a plurality of frame bar apertures 48 in each of the left and right frame arms 44 and 45, thereby locking the frame 32 into a desired frame size. In addition to allowing the frame 32 to be adjustable, this configuration also allows the frame 32 to be collapsible so that it can be more readily stored and transported while not in use. While this embodiment is preferred, those skilled in the art will recognize that there are many ways of making the frame 32 adjustable and/or collapsible, and any equivalent structures should be considered within the scope of this invention.

Method of Use

The invention includes a method for using the dolly 30 to transport the heavy object 10. Another method first requires that the user provide the heavy object 10 and the dolly 30 described above. The lifting bore 20 is first attached to the heavy object 10. This step is already performed, in the preferred embodiment, because the power trowel 10 of the preferred embodiment is constructed with the lifting bore 20. In the alternative embodiment, the lifting bore 20 is bolted to the heavy object 10 with the pair of bore bolts 60.

Figure 3:
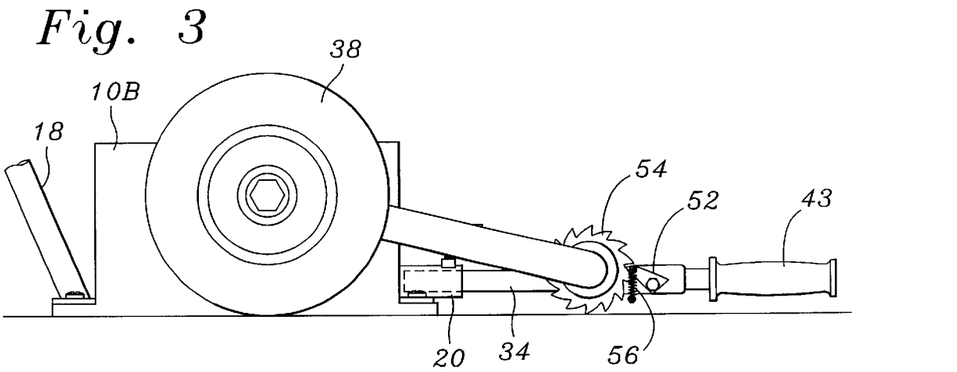
FIG. 3 is a side elevational view of the dolly in a lowered position, a lifting bar of the dolly being positioned within a lifting bore of a heavy object.

When movement of the heavy object 10 is desired, the dolly 30 is positioned such that the heavy object 10 is located between the pair of wheels 38. As shown in FIG. 3, the lifting bar 34 is then inserted into the lifting bore 20. It is worth noting that, in the preferred embodiment, this step is greatly facilitated if the lifting bar 34 is pivotally connected to the frame 32 because small adjustments on the angle of the lifting bar 34 make the insertion much easier.

Figure 4:
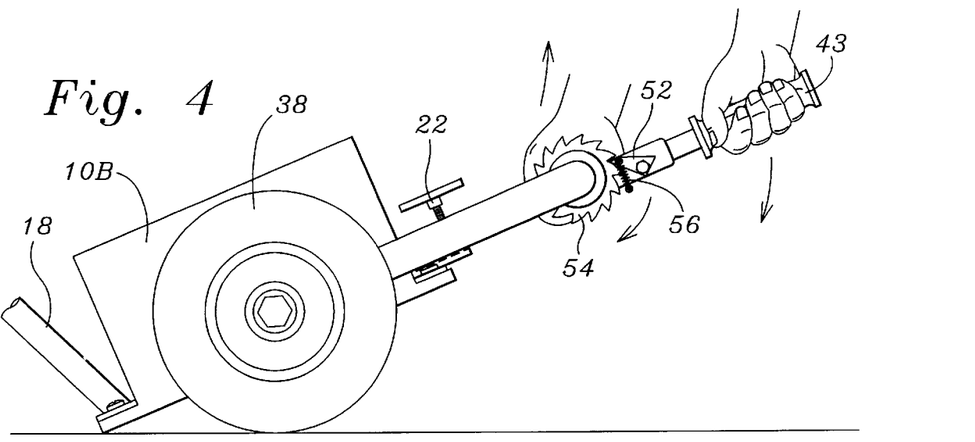
FIG. 4 is a side elevational view of the dolly being raised from the lowered position to a raised position.
Figure 5:
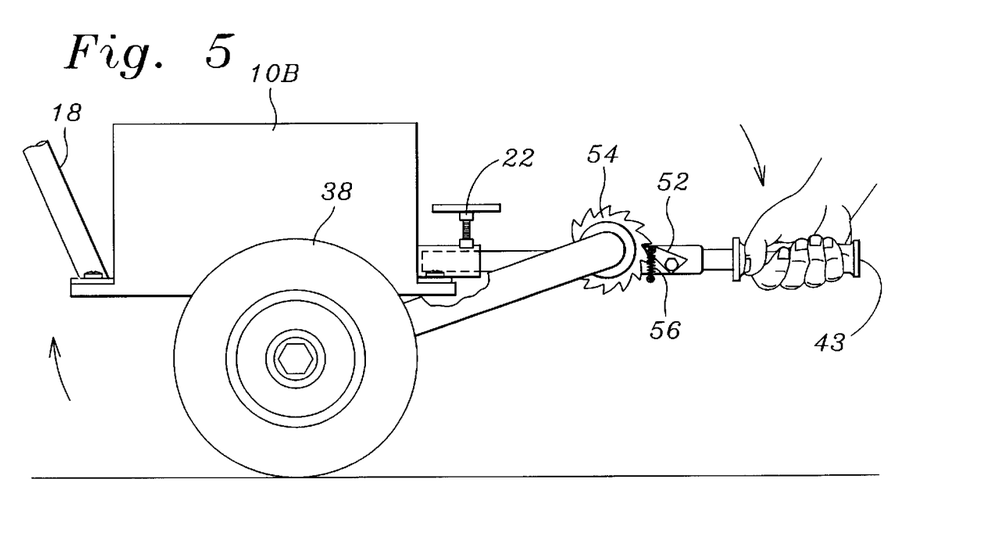
FIG. 5 is a side elevational view of the dolly in the raised position, the dolly functioning to support the heavy object off the ground on the pair of wheels.

As shown in FIG. 4, the user then lifts the frame 32 of the dolly 30, thereby partially lifting the heavy object 10 and causing the lifting bar 34 to pivot from the lowered position to the raised position. This lifting step is facilitated if the dolly 30 includes the hand grip 43, because the user can push down on the hand grip 43 while pulling up on the frame 32, thereby making the lifting step less strenuous. The frame 32 is lifted until the ratchet mechanism 50 locks the frame 32 into the raised position. The frame 32 is then lowered, as shown in FIG. 5, thereby levering the heavy object 10 onto the pair of wheels 38 for wheeled movement.

In the preferred embodiment, as shown in FIGS. 1 and 6–8, the heavy object 10 provides an upwardly extending handle 18. In the preferred embodiment, the upwardly extending handle 18 is integral to the heavy object 10. In an alternative embodiment, the upwardly extending handle 18 is attached to the heavy object 10 with a pair of handle bolts 62. The upwardly extending handle 18 is then used to manipulate the heavy object 10.

In the alternative embodiment, the frame 32 of the dolly 30 is adjusted in size so that the frame 32 fits around the power trowel 10 in the desired fashion. The frame 32 is preferably constructed so that it can be adjusted to fit many or all of the most popular styles of power trowel 10. The dolly 30 is positioned such that the frame 32 of the dolly 30 fits around the power trowel 10 and one of the pair of wheels 38 is on either side of the power trowel 10.

Alternative Method of Use

Figure 12:
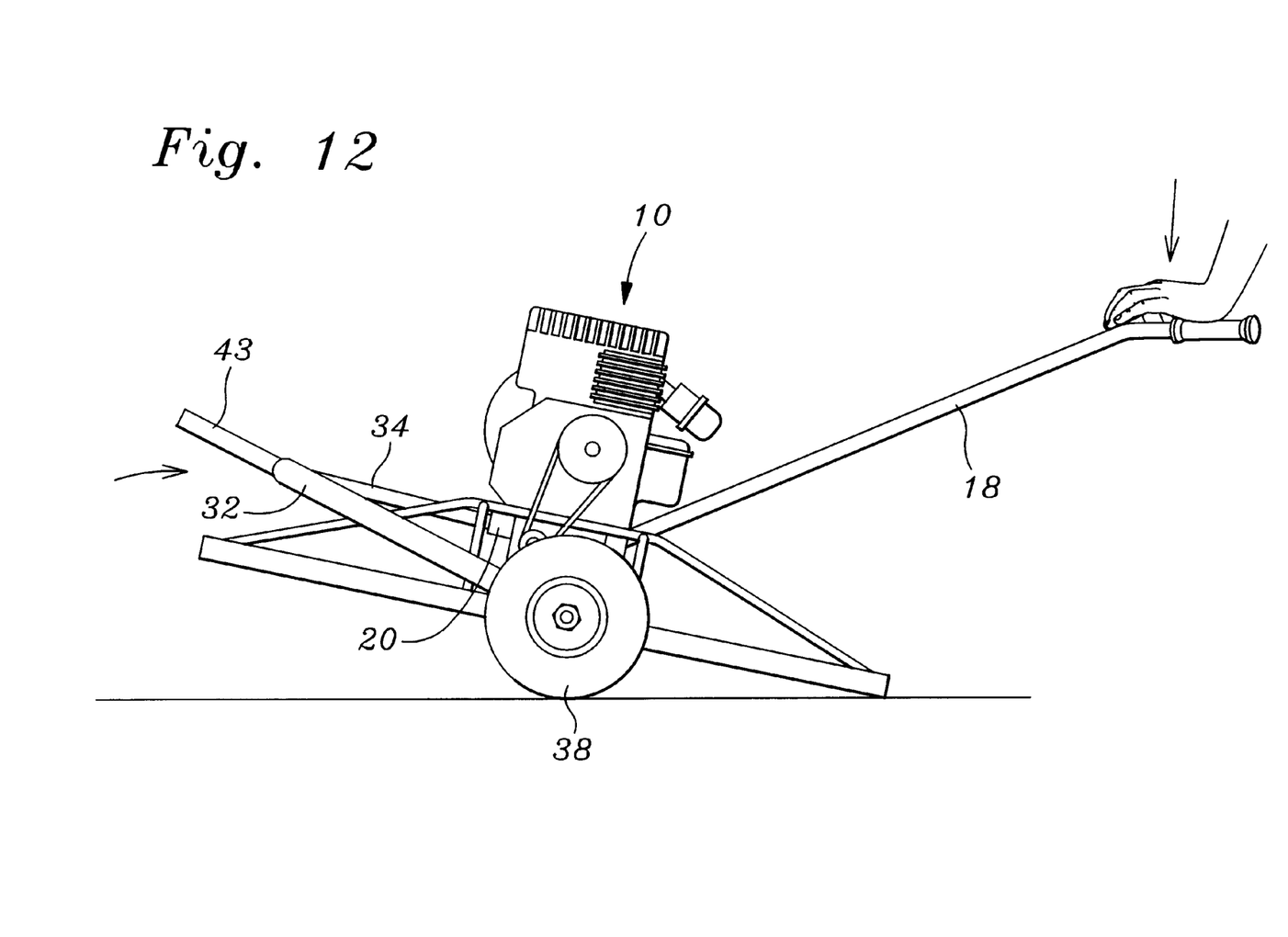
FIG. 12 is a side elevational view of the power trowel being tilted back so that the dolly can be attached to the power trowel.

An alternative embodiment, in which the lifting bar 34 is not pivotally connected to the frame 32, is shown in FIGS. 6–8. In this embodiment, one user must depress the upwardly extending handle 18 to lever the lifting point 20 of the power trowel 10 into a raised position. In the raised position, as shown in FIG. 12, the lifting bar 34 of the dolly 30 can be attached to the lifting point 20 of the power trowel 10. In the preferred embodiment, the lifting bar 34 is inserted into the lifting bore 20. The upwardly extending handle 18 is then lifted back to a horizontal position, as shown in FIG. 8, thereby levering the power trowel 10 upwards into a position in which the power trowel 10 is supported by the pair of wheels 38. The power trowel 10 can then be pushed and maneuvered on the dolly 30 by manipulating the upwardly extending handle 18.

It is important to note that it is an important benefit of this invention that, when using the dolly 30 to move the power trowel 10, all movements are lever actions that greatly reduce the strain of lifting the power trowel 10, thereby preventing fatigue and possible injury to the user. Furthermore, since only a single attachment is required, use of the dolly 30 is both fast and easy. It is important that use of the dolly 30 be both fast and easy, otherwise many users would often move the power trowel 10 without the dolly 30 just to save time. As described above, lifting the power trowel 10 without the assistance of the dolly 30 leads to both fatigue and injury so it is important to avoid situations in which users may not use the dolly 30 but prefer to move the power trowel 10 by hand. The fast and easy connection provided by this invention maximizes the use of the dolly 30 to move the power trowel 10 because it is faster and easier to move the power trowel 10 with the dolly 30 of this invention than it is to move the power trowel 10 by hand.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A combination power trowel and dolly, the combination comprising:
   a power trowel having an engine operably engaged to a plurality of trowel blades, the engine providing a lifting point, an upwardly extending handle, and supporting a blade guard, the power trowel further having a center of gravity;

a dolly having a frame and a lifting element, the frame having two ends and being generally U-shaped to fit around the power trowel when the lifting element is removably attached to the lifting point of the power trowel; and a pair of wheels, each of the pair of wheels being operably attached adjacent to one of the two ends of the frame and aligned along an axis to support the power trowel between the pair of wheels such that the center of gravity is located approximately on the axis when the lifting element is attached to the lifting point of the power trowel.

2. The combination of claim 1 wherein the lifting bar is pivotally connected to the frame of the dolly.

3. The combination of claim 2 wherein the lifting bar is pivotally connected to the frame of the dolly with a sleeve positioned around the frame, the sleeve allowing the lifting bar to pivot between a lowered position to a raised position, the sleeve further having a means for restricting the lifting bar from returning to the lowered position once the lifting bar has been raised to the raised position.

4. The combination of claim 2 wherein the lifting bar is pivotally connected to the frame of the dolly with a sleeve positioned around the frame, the sleeve allowing the lifting bar to pivot between a lowered position to a raised position, the sleeve further having a hand grip extending radially outward from the sleeve opposite the lifting bar, the hand grip having a pawl that cooperates with a ratchet on the frame to restrict the lifting bar from returning to the lowered position once the lifting bar has been raised to the raised position.

5. The combination of claim 1 further comprising a locking pin, and wherein the lifting point is a lifting bore shaped to receive the lifting bar, the lifting bore having a bore aperture and the lifting bar having a bar aperture, the locking pin being shaped to removably engage both the bar aperture and the bore aperture to lock the lifting bar within the lifting bore.

6. A combination dolly and heavy object, the combination comprising:

a heavy object having a lifting bore and a center of gravity;

a dolly having a frame and a lifting bar, the frame having two ends and being generally U-shaped to fit around the heavy object when the lifting bar is inserted into the lifting bore; and a pair of wheels, each of the pair of wheels being operably attached adjacent to one of the two ends of the frame and aligned along an axis to support the heavy object between the pair of wheels such that the center of gravity is located approximately on the axis when the lifting bar is inserted into the lifting bore of the heavy object.

7. The combination of claim 6 further comprising a locking pin, a bore aperture in the lifting bore, and a bar aperture in the lifting bar, the locking pin being shaped to removably engage both the bar aperture and the bore aperture to lock the lifting bar within the lifting bore.

8. The combination of claim 7 wherein the lifting bar is pivotally connected to the frame of the dolly.

9. The combination of claim 8 wherein the lifting bar is pivotally connected to the frame of the dolly with a sleeve positioned around the frame, the sleeve allowing the lifting bar to pivot between a lowered position to a raised position, the sleeve further having a means for restricting the lifting bar from returning to the lowered position once the lifting bar has been raised to the raised position.

10. The combination of claim 8 wherein the lifting bar is pivotally connected to the frame of the dolly with a sleeve positioned around the frame, the sleeve allowing the lifting bar to pivot between a lowered position to a raised position, the sleeve further having a hand grip extending radially outward from the sleeve opposite the lifting bar, the hand grip having a pawl that cooperates with a ratchet on the frame to restrict the lifting bar from returning to the lowered position once the lifting bar has been raised to the raised position.

11. The combination of claim 6 wherein the heavy object includes an upwardly extending handle.

12. A method for using a dolly to transport a heavy object, the method comprising the steps of:

a) providing a dolly having a frame, a lifting bar, and a pair of wheels, the lifting bar being pivotally connected to the frame such that the lifting bar can be pivoted from a lowered position to a raised position, and each of the pair of wheels being operably connected to the frame;

b) providing a lifting bore;

c) attaching the lifting bore to the heavy object;

d) positioning the dolly such that the heavy object is between the pair of wheels;

e) inserting the lifting bar into the lifting bore;

f) lifting the frame of the dolly, thereby partially lifting the heavy object and causing the lifting bar to pivot from the lowered position to the raised position; and g) lowering the frame, thereby levering the heavy object onto the pair of wheels.

13. The method of claim 12 further comprising the following steps:

h) providing an upwardly extending handle;

i) attaching the upwardly extending handle to the heavy object; and j) moving the upwardly extending handle to manipulate the heavy object.

* * * * *